Oct. 24, 1939.   E. L. BARRETT   2,177,472
DYNAMO-ELECTRIC MACHINE
Filed Nov. 16, 1938

Inventor
Edward L. Barrett
BY
Parker, Carlson, Pitzner & Hubbard
Attorneys.

Patented Oct. 24, 1939

2,177,472

UNITED STATES PATENT OFFICE

2,177,472

DYNAMO-ELECTRIC MACHINE

Edward L. Barrett, La Grange, Ill., assignor to Utah Radio Products Company, Chicago, Ill., a corporation of Illinois Application November 16, 1938, Serial No. 240,774

12 Claims. (Cl. 172—36)

The invention relates to dynamo electric machines and more particularly to improvements in commutator type dynamo electric machines. Even more particularly, most of the features of the present invention relate to innovations in the construction of so-called permanent magnet type motors or the like, although in some aspects the invention is also applicable to other classes of commutator type motors or other dynamo electric machines.

One general object of the invention is to provide an electric motor or other dynamo electric machine of the type embodying a permanent magnet field structure, which motor is very simple and cheap to construct although having a strong torque in relation to the size of the motor and being efficient in operation.

A more specific object of the invention is to provide an electric motor or other dynamo electric machine embodying a stator made up of a plurality of structurally separate parts including at least one permanent magnet, and in which these separate parts are held in assembled relation as a unitary structure simply by the magnetic forces exerted by the permanent magnet or magnets. By utilizing such an arrangement it is possible to fashion the parts of the stator structure in simple pieces without expensive machining, bending or fabrication, and furthermore it is unnecessary to use welding, screws or other holding means to put the parts together. Accordingly, a substantial saving is realized both in the cost of fashioning the parts and in the cost of assembling them.

Another object of the invention is to provide a commutator type electric motor or other dynamo electric machine in which the parts are arranged in a novel manner to achieve an extreme compactness as well as simplicity of construction, particularly, for example, in the enclosing casing and brush mounting arrangements for the motor.

Further objects and advantages of the invention will become apparent as the following description proceeds taken in connection with the accompanying drawing, in which:

Fig. 1 is a general perspective view of an electric motor embodying the invention.

Figs. 2 and 3 are enlarged longitudinal sectional views taken respectively along the lines 2—2 and 3—3 in Fig. 1.

For purposes of exemplification and explanation of its various novel features, the invention has been shown herein as embodied in a commutator motor provided with a permanent magnet type of stator. This motor is especially suited for operation from a low voltage direct current source of power such as the conventional storage battery in an automobile. The driving of radio receiver tuning devices, windshield wipers, or the actuation of small control and indicator devices in aeroplanes are but a few examples of the fields in which the motor herein shown finds utility. Its light weight and extreme compactness, in proportion to its output torque, render it especially suited for use in such vehicles where space and weight are at a premium. Additionally, the low current consumption of this motor is especially desirable when it is to be supplied from some limited source of power, such as an automobile storage battery.

Figure 1:
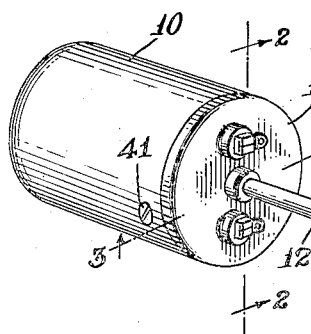
Figure 2:
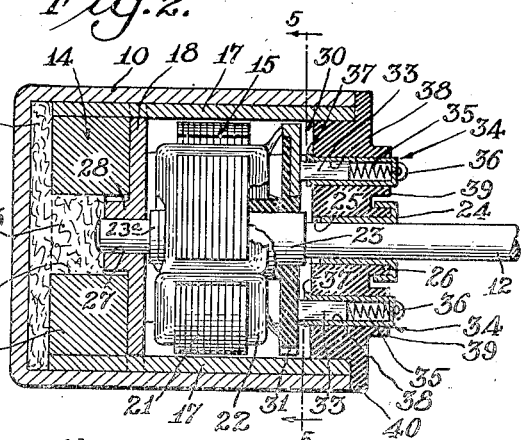
Figure 3:
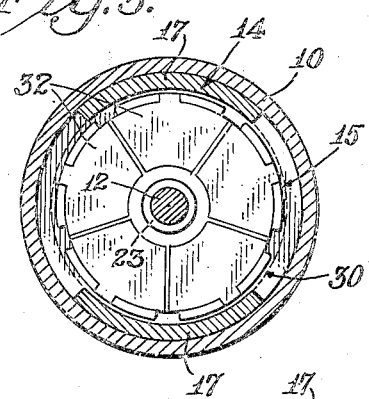

Referring more particularly to Fig. 1, the exemplary motor therein shown embodies a generally cylindrical cup-shaped casing 10, having its open end closed by a disk shaped plug 11 from which projects the motor shaft 12. The casing 10 is simply a protective enclosure, in the particular construction shown, and is preferably made of nonmagnetic material such as brass so that it will not interfere with the interiorly located magnetic circuit of the motor. Housed within the casing 10 is a motor structure embodying as its general elements, a stator 14 and a rotor 15 (Figs. 2 and 3). This motor structure is assembled independently of the casing 10 and inserted into it as a unitary structure, with the plug 10 forming a part of the stator assembly 14.

Figure 4:
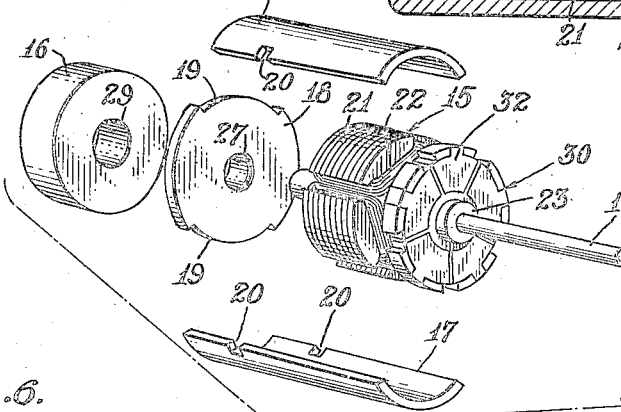
Fig. 4 is an exploded perspective view of the motor of Fig. 1 with the casing omitted.

Simplicity and low cost of production for the stator assembly are achieved by utilizing a structure made up of several simple and structurally separate parts held together in a cage-like form to embrace the rotor, simply by the magnetic forces exerted by a permanent magnet or magnets included as part of the stator assembly. In the illustrative embodiment shown (Figs. 2, 3, and 4) the stator includes a disk 16 of magnetizable material having high magnetic retentivity, "Alnico" being a material suitable for the purpose. This disk or slug 16 can be economically formed by simply casting disks of the proper size which may be ground a small amount for finishing. Pole piece projections on opposite sides of the disks 16, shaped to embrace the rotor 15, are formed by elongated plates 17. These plates are generally rectangular in form (Fig. 4) and are curved transversely to conform with the circumferential curvature of the disk 16. By stamping the plates 17 from cold rolled steel or some other suitably magnetizable sheet metal, in an ordinary punch press operation, the cost of making these plates may be minimized. The pole piece plates 17 are arranged (Fig. 2) with their butt end portions snugly fitted about opposite sides of the disk 16 and projecting axially therefrom so that the plates span the gap to the opposite end disk or plug 11. This later disk is made of nonmagnetic material and preferably an insulating material such as "Bakelite." It has a diameter substantially identical with the disk 16 and constitutes a spacer for the outer ends of the pole piece plates 17.

A loose cage-like structure defining a central recess for the rotor 15 is formed when the end disks 16 and 11, and the side plates 17, are placed together in the general configuration described above. To hold these parts assembled, in the relation shown in Fig. 2, the disk 16 is permanently magnetized, with the rotor 15 in place within the cage. The general method necessary for magnetizing such a structure is, of course, well understood in the art. In brief, a direct current excited electromagnet may be presented to the structure for a brief interval with its poles disposed opposite the points on the disk 16 which are contacted by the butt ends of the pole piece plates 17. When the disk 16 is magnetized in this manner, the pole piece plates 17 are snapped down tight against it and frictionally engage the insulating disk 11 between their outer ends. The rotor 15, between the pole piece plate 17, acts as a keeper for the permanent magnet so that it retains its magnetism throughout the life of the motor without any necessity for remagnetization. The pole piece plates 17 are preferably only about one thirty-second of an inch in thickness, or in other words thin and flexible enough so that if their initial curvature does not exactly conform to the disk 16, the magnetic attractive forces exerted upon them will serve to pull them tight against the disk 16 and into the configuration of the latter disk's periphery.

To locate the pole piece plates 17 at diametrically opposed points on the magnet disk 16, a disk 18 of nonmagnetic material such as brass is loosely fitted on the inner face of the disk 16. This disk 18 is somewhat larger in diameter than the disk 16 and is notched on opposite sides as indicated at 19 (Fig. 4) to receive the pole piece plates 17 and thereby form a locating jig for them. Complemental notches 20 are also formed in the side edges of the pole piece plates 17 to receive the portions of the disk 18 at the ends of the notches 19 so as to prevent longitudinal skewing of the plates 17 and axial displacement of plate 18.

The rotor 15 is of the conventional salient pole type. It is made up of a stack of laminations 21 formed from a suitably magnetizable material such as silicon steel, with the laminations shaped to present a plurality of salient poles shown herein as being five in number. Each of these pole pieces on the rotor is encircled by an energizing winding 22. The stack of rotor laminations 21 is force fitted on a sleeve 23 (Fig. 2) preferably made of nonmagnetic material such as brass, and which is in turn force fitted on the rotor shaft 12. The rotor 15 is coaxial with the stator end disks 11 and 16 and is slightly smaller in diameter than these disks so as to provide the necessary small air-gap clearance between the rotor and the cooperating pole piece plates 17.

To support the rotor 15 for rotation, the outer end of the shaft 12 is journaled in a metal bushing 25 (Fig. 2) which is fitted in a central bore 25 in the insulating disk 11. The outer end of the bushing 24 is spun over a nipple 26 on the insulating disk, which surrounds the bore 25. Similarly the inner end of the rotor shaft 12 is journaled in the locating disk or plate 18. For this purpose a central aperture 27 is formed in the disk 18 and surrounded by a flange 28 to form a bearing of suitable length. This flange and the end of the shaft 12 are received within a clearance hole 29 in the magnetic disk 16. A steel bearing washer 23ª is preferably fitted at the inner end of the sleeve 23 (Fig. 2).

Figure 5:
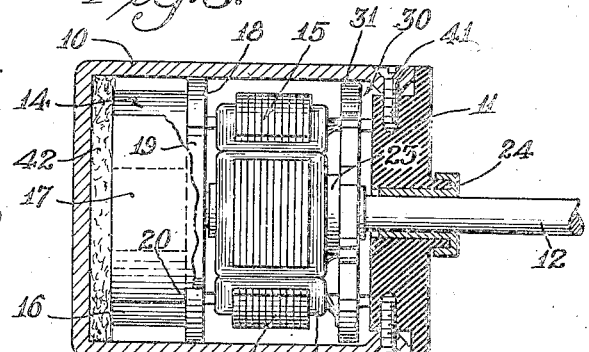
Fig. 5 is a transverse sectional view along the line 5—5 of Fig. 2.

For the sake of simplicity and compactness an end face type of commutator 30 (Fig. 2) is used on the rotor 15. This commutator has been shown herein as including a disk 31 of insulating material such as Bakelite force fitted on the shaft sleeve 23. On the outer face of this disk are fixed a plurality of segments 32 (Figs. 4 and 5) of conductive material such as copper. In the usual manner the segments 32 correspond in number with the windings on the rotor 15 and the parting lines between the segments bisect the pole pieces of the rotor. The usual end connections (not shown in detail) are provided from the rotor windings 22 to the corresponding commutator segments 32.

Figure 6:
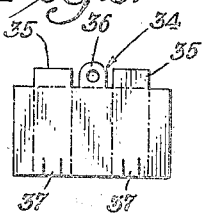
Fig. 6 is a detailed developed view of one of the sheet metal brush housings.

Brushes cooperating with the commutator 30 may be conveniently mounted on the spacer disk 11 and it is for this reason that the latter part is preferably made of insulating material. Brushes 33 (Figs. 2 and 4) shown herein are rectangular in form, being made of a carbon and metal mixture or the like common for the purpose, with a copper jacket, and are slidably mounted in sheet metal housings 34. Small helical compression springs 35 urge the brushes 33 into engagement with the opposed faces of the commutator segments 32. From the developed view in Fig. 6, it will be seen that each of the brush housings 34 may be conveniently formed as a stamping from a single piece of sheet metal such as brass. The pieces are stamped out in generally rectangular form as shown in Fig. 6 and are bent transversely along the bending lines indicated in dot-dash lines to form the four walls of the housing. The upper end of the housing is closed by the ears 35, and an ear 36 serves as the terminal for connecting the brush to the corresponding terminal of a battery or other suitable electrical supply line. Tongues 37 struck out from the lower ends of the housing are bent to engage the inner face of the supporting disk 11 (Fig. 2) so as to prevent dislodgment of the brush housing. Upon reference to Figs. 2 and 4, it will be seen that each of the brush housings 34 is inserted in a complemental rectangular hole 38 in the insulating disk 11, the outer ends of each of these holes being provided with a reenforcing projection or flange 39.

In assembling the motor described above, the rotor 15 is placed between the stator end disks 11 and 16, and the rotor shaft 12 is journaled in the disk 18 and in end disk 11 as was previously noted. The side pole piece plates 17 are then placed in position to complete the stator cage, and the stator disk 16 is permanently magnetized as described above. With the parts so arranged, the assembly is completely operative and may be initially tested by connecting a suitable source of electric current to the brush terminals 36.

As a final step in completing the motor shown, the motor assembly is inserted into the protective casing 10. An annular flange 40 (Fig. 3) on the insulating plug or disk 11 abuts against the end of the casing to limit the depth of insertion of the unit. Finally a pair of screws 41 are put in place to hold the casing 10 on the disk 11.

Permanent lubrication of the inner bearing for the rotor shaft 12 throughout the life of the motor is accomplished by placing a disk 42 (Fig. 2) of felt or the like impregnated with lubricating oil in the bottom of the casing 10, prior to the insertion of the motor unit. Also a wadding 43 of felt or the like impregnated with oil is placed in the bottom of the clearance hole 29 in the magnetic disk 16. In this way oil is continuously supplied to the inner end of the rotor shaft which is journaled in the plate 18. The bearing at the outer end of the shaft 12 can be readily lubricated from the exterior of the device.

The operation of the motor herein disclosed will be apparent from the foregoing. In general, it is simply necessary to connect a suitable source of direct current to the brush terminals 36 in order to energize the motor for rotation. The permanent magnet field structure will retain its magnetism throughout substantially the mechanical life of the motor. Of course, if it is desired to remagnetize the structure, it is simply necessary to withdraw the screws 41 and slip off the outer casing 10. Thereupon the magnet structure is exposed for remagnetization in the same manner by which the initial magnetization is accomplished.

Although a particular embodiment of the invention has been shown and described in some detail, there is no intention to thereby limit the invention to such embodiment but on the other hand the appended claims are intended to cover all modifications and alternative constructions falling within the spirit and scope of the invention.

I claim as my invention:

1. A dynamo electric machine comprising, in combination, two disks of substantially equal diameter disposed in axially alined spaced relation with respect to each other, one of said disks being a permanent magnet and the other being made of nonmagnetic material, a rotor disposed between said disks for rotation about an axis substantially coincident with the disk axes, and a pair of elongated plates of magnetizable material spanning the gap between said disks and disposed in opposed relation on diametrically opposite sides thereof to form pole pieces completing a magnetic circuit from opposite sides of said magnet disk to corresponding portions of said rotor, said plates being curved transversely to conform to the curvature of the disk peripheries and to lie snugly against the same, and said plates being structurally separate from said disks and held in position thereon simply by magnetic attraction.

2. A dynamo electric machine comprising, in combination, a disk shaped permanent magnet, a pair of elongated plates of magnetizable material disposed in opposed relation on diametrically opposite sides of said disk and projecting axially therefrom in generally parallel spaced relation, a second disk of nonmagnetic material positioned on one face of said first named disk and having notches formed in the periphery thereof engageable with said plates for locating the same on substantially diametrically opposite sides of said first named disk, said plates being curved transversely to conform to the curvature of said first named disk's periphery and to lie snugly against the same, said plates being structurally separate from said first named disk and held in position thereon simply by magnetic attraction, a nonmagnetic spacer member between the opposed outer ends of said plates, and a rotor disposed for rotation between said plates.

3. A dynamo electric machine comprising, in combination, a disk shaped permanent magnet, a pair of elongated plates of magnetizable material disposed in opposed relation on diametrically opposite sides of said disk and projecting axially therefrom in generally parallel spaced relation, a second disk of nonmagnetic material positioned on one face of said first named disk and having notches formed in the periphery thereof engageable with said plates for locating the same on substantially diametrically opposite sides of said first named disk, said plates being curved transversely to conform to the curvature of said first named disk's periphery and to lie snugly against the same, said plates being structurally separate from said first named disk and held in position thereon simply by magnetic attraction, a nonmagnetic spacer member between the opposed outer ends of said plates, and a rotor disposed between said plates and carried by a shaft having its opposite ends journaled respectively in said nonmagnetic disk and in said nonmagnetic spacer member.

4. A dynamo electric machine comprising, in combination, a cage-like stator structure embodying a pair of spaced end members and a pair of structurally separate side members extending between said end members on opposite sides thereof, one of said end members being a permanent magnet and the other being made of nonmagnetic material, said side members being made of magnetizable material and held on said one end member by the magnetic attractive force exerted thereon by said one end member, and a rotor of magnetizable material located within said cage-like stator structure and extending between said side members in closely spaced relation thereto to form a keeper for the magnetic circuit formed by said one end member and said side members.

5. In a dynamo electric machine, a permanent magnet type of stator structure comprising, a disk shaped permanent magnet, a pair of pole piece plates of magnetizable material structurally separate from said magnet disk and projecting therefrom in spaced and opposed relation to each other with the butt end portions of each of said pole piece plates contacting diametrically opposite sides of said magnet disk and held against the same by the magnetic attraction exerted thereon by the latter, and a second disk of nonmagnetic material disposed between the opposed portions of said pole piece plates and against one face of said magnet disk, said disk of nonmagnetic material being peripherally notched to engage said pole piece plates and locate the same at opposite sides of said magnet disk.

6. In a dynamo electric machine, a permanent magnet type of stator structure comprising, a piece of permanently magnetized material, a pair of pole pieces of magnetizable material structurally separate from said first named piece and projecting therefrom in spaced and opposed relation to each other with the butt end portions of each of said pole pieces contacting opposite sides of said first named piece and held against the same by the magnetic attraction exerted thereon by the latter, and a locating member made of nonmagnetic material disposed between the opposed portions of said pole pieces and engageable with the same and locating them at opposite sides of said first named piece.

7. A dynamo electric machine comprising, in combination, a rotor and a permanent magnet stator member, characterized by the inclusion of a pair of pole pieces structurally separate from said permanent magnet but disposed thereon to project into close proximity to spaced portions of said rotor and held in position simply by magnetic attraction.

8. A dynamo electric machine comprising, in combination, a rotor, a permanent magnet stator structure which is generally U-shaped in cross section embracing said rotor with the base of the U extending transversely across one end of the rotor and with the arms of the U projecting along opposite sides of the rotor and generally axially thereof, an end face commutator on the end of said rotor opposite said one end thereof, a plurality of brushes contacting said commutator, and a nonmagnetic supporting structure for said brushes spanning the opposite end of said U-shaped stator structure.

9. A dynamo electric machine comprising, in combination, a rotor, a permanent magnet stator structure which is generally U-shaped in cross section embracing said rotor with the base of the U extending transversely across one end of the rotor and with the arms of the U projecting along opposite sides of the rotor generally axially thereof, an end face commutator on the end of said rotor opposite said one end, a plurality of brushes contacting said commutator, a cup shaped casing of nonmagnetic material telescoped about said stator structure with the base of the U disposed in the bottom of said casing, and a plug of insulating material substantially closing the opposite end of said casing and supporting said brushes in operative relation with said commutator.

10. A dynamo electric machine comprising, in combination, a generally cylindrical cup shaped casing, a plug of insulating material substantially closing the open end of said casing, a rotor disposed within said casing for rotation about an axis extending axially of said casing, an end face commutator on the outer end of said rotor facing axially outward therefrom, and a plurality of brushes contacting said rotor and supported on said plug of insulating material.

11. A dynamo electric machine comprising, in combination, a generally cup shaped casing, a stator assembly fitted within said casing and having a bottom wall disposed in spaced relation with the bottom wall of said casing, said stator assembly defining a central rotor recess, a rotor disposed in said recess and carried by a shaft extending axially and generally centrally of said casing, means for journalling the inner end portion of said shaft on said stator assembly, and means in the space between the bottom of said casing and the bottom of said stator assembly for supplying lubricant to said last named means.

12. In a dynamo electric machine, a stator structure embodying a plurality of structurally separate magnetizable members, and means including a permanent magnet contacting said members for not only holding them in predetermined position by magnetic attraction but for also setting up a magnetic field threading the same for cooperation with an associated rotor.

EDWARD L. BARRETT.